(12) United States Patent
Dunn et al.

(10) Patent No.: US 8,391,865 B2
(45) Date of Patent: Mar. 5, 2013

(54) SYSTEM SELECTION METHOD AND ARRANGEMENT FOR MOBILE WIRELESS COMMUNICATION DEVICES

(75) Inventors: Doug Dunn, Chula Vista, CA (US); Amit Kalhan, La Jolla, CA (US); Timothy Thome, Spring Valley, CA (US); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 824 days.

(21) Appl. No.: 11/691,170

(22) Filed: Mar. 26, 2007

(65) Prior Publication Data

US 2007/0223516 A1    Sep. 27, 2007

Related U.S. Application Data

(60) Provisional application No. 60/786,759, filed on Mar. 27, 2006.

(51) Int. Cl.
*H04W 4/00* (2009.01)
(52) U.S. Cl. .................. 455/435.2; 455/432.1; 455/434; 455/435.3; 455/552.1; 370/310; 370/328; 370/338
(58) Field of Classification Search ............... 455/435.2, 455/435.3, 552.1, 432.2, 433, 434, 435.1, 455/436–448; 370/462, 328, 310, 461, 311, 370/338
See application file for complete search history.

(56) References Cited

U.S. PATENT DOCUMENTS

| | | | | |
|---|---|---|---|---|
| 7,180,876 | B1 * | 2/2007 | Henry et al. | 370/329 |
| 7,318,111 | B2 * | 1/2008 | Zhao | 709/250 |
| 7,603,119 | B1 * | 10/2009 | Durig et al. | 455/432.3 |
| 2004/0022216 | A1 * | 2/2004 | Shi | 370/335 |
| 2005/0037755 | A1 | 2/2005 | Hind et al. | |
| 2005/0059397 | A1 | 3/2005 | Zhao | |
| 2005/0083899 | A1 | 4/2005 | Babbar et al. | |
| 2005/0286461 | A1 * | 12/2005 | Zhang et al. | 370/328 |
| 2006/0198359 | A1 * | 9/2006 | Fok et al. | 370/351 |
| 2006/0217147 | A1 * | 9/2006 | Olvera-Hernandez et al. | 455/552.1 |
| 2006/0234705 | A1 * | 10/2006 | Oommen | 455/435.3 |
| 2006/0259951 | A1 | 11/2006 | Forssell et al. | |
| 2007/0008978 | A1 * | 1/2007 | Pirzada et al. | 370/395.43 |

OTHER PUBLICATIONS

Internet document: "Multi-mode System Selection Requirements", 3rd Generation Partnership Project (3GPP2), 3GPP2 C.PXXXX, Version 0.5, Jan. 7, 2005, at ftp://ftp.3gpp2.org/TSGC/Working/2005/2005-01-Vancouver/TSG-C-2005-01-Vancouvor/WG1/SWG14/C14-20050110-010_C.Pxxxx_Multimode_System_Selection_v0.5.ZIP (accessed Aug. 8, 2006).

* cited by examiner

*Primary Examiner* — Jinsong Hu
*Assistant Examiner* — Magdi Elhag

(57) ABSTRACT

An exemplary method for selecting one of a plurality of systems on a multi-mode device capable of communicating on a first air interface technology and a second air interface technology is disclosed. Initially, a carrier input associated with one of the first and second air interface technologies is received. The carrier input typically defines at least one system selection event. Next, a first network acquisition attempt of the other one of the first and second air interface technologies is triggered responsive to the system selection event. The results of the first network acquisition attempt are determined and stored, and subsequently used for subsequent system selection determinations between the first and second air interface technologies.

40 Claims, 2 Drawing Sheets

SYSTEM SELECTION METHOD AND ARRANGEMENT FOR MOBILE WIRELESS COMMUNICATION DEVICES

RELATED APPLICATIONS

This application claims the benefit of U.S. Provisional Application 60/786,759, filed Mar. 27, 2006, which is hereby incorporated by reference.

FIELD OF THE INVENTION

The present invention relates to the field of wireless communication devices. More specifically, the invention relates to a system selection technique for wireless communication devices capable of a communication over a plurality of air interface technologies.

BACKGROUND OF THE INVENTION

A typical wireless communication device, such as a mobile phone, comprises, among other things, a processor coupled to a memory and to a transceiver, each enclosed in a housing. A mobile power source, such as a battery, is coupled to and supplies power to the processor, the memory and the transceiver. A speaker and a microphone are also enclosed within the housing for transmitting and receiving, respectively, acoustic signals to and from a user of the wireless communication device. The wireless communication device communicates information by transmitting and receiving electromagnetic ("EM") energy in the radio frequency ("RF") band via an antenna coupled to the transceiver.

More recently, mobile communication devices have been developed that communicate over a plurality of air interface technologies. For example, a mobile handset may be designed to incorporate both cellular telephony technology and wireless local area network ("WLAN") technology. Such devices can be referred to as multi-mode handset devices, because of the multiple air interface modes in which the device may be configured.

A significant challenge facing the design and development of multi-mode handsets is the ability to efficiently and optimally configure the device to an appropriate air interface. For example, if the handset were configured such that cellular networks have priority over WLAN, it would be very difficult for multi-mode handset to access WLAN. The main reason for this difficulty is the fact that WLAN coverage is small and spotty compared to cellular network coverage, and further because WLAN Access Points ("APs") are typically embedded within cellular network coverage.

Accordingly, there is a strong need in the art for an efficient and optimized method for providing system selection for multi-mode wireless communication devices.

SUMMARY OF THE INVENTION

An exemplary method for selecting one of a plurality of systems on a multi-mode device capable of communicating on a first air interface technology and a second air interface technology is disclosed. Initially, a carrier input associated with one or more of the first and second air interface technologies is received. The carrier input typically defines at least one system selection event. Next, a first network acquisition attempt of the other one of the first and second air interface technologies is triggered responsive to the system selection event. The results of the first network acquisition attempt are determined and stored. In this way, a subsequent system acquisition selections between the first and second air interface technologies can be based upon the stored results of the first network acquisition attempt, resulting in significantly improved and efficient system selection determinations.

Other features and advantages of the present invention will become more readily apparent to those of ordinary skill in the art after reviewing the following detailed description and accompanying drawings.

DETAILED DESCRIPTION OF THE INVENTION

Figure 1:
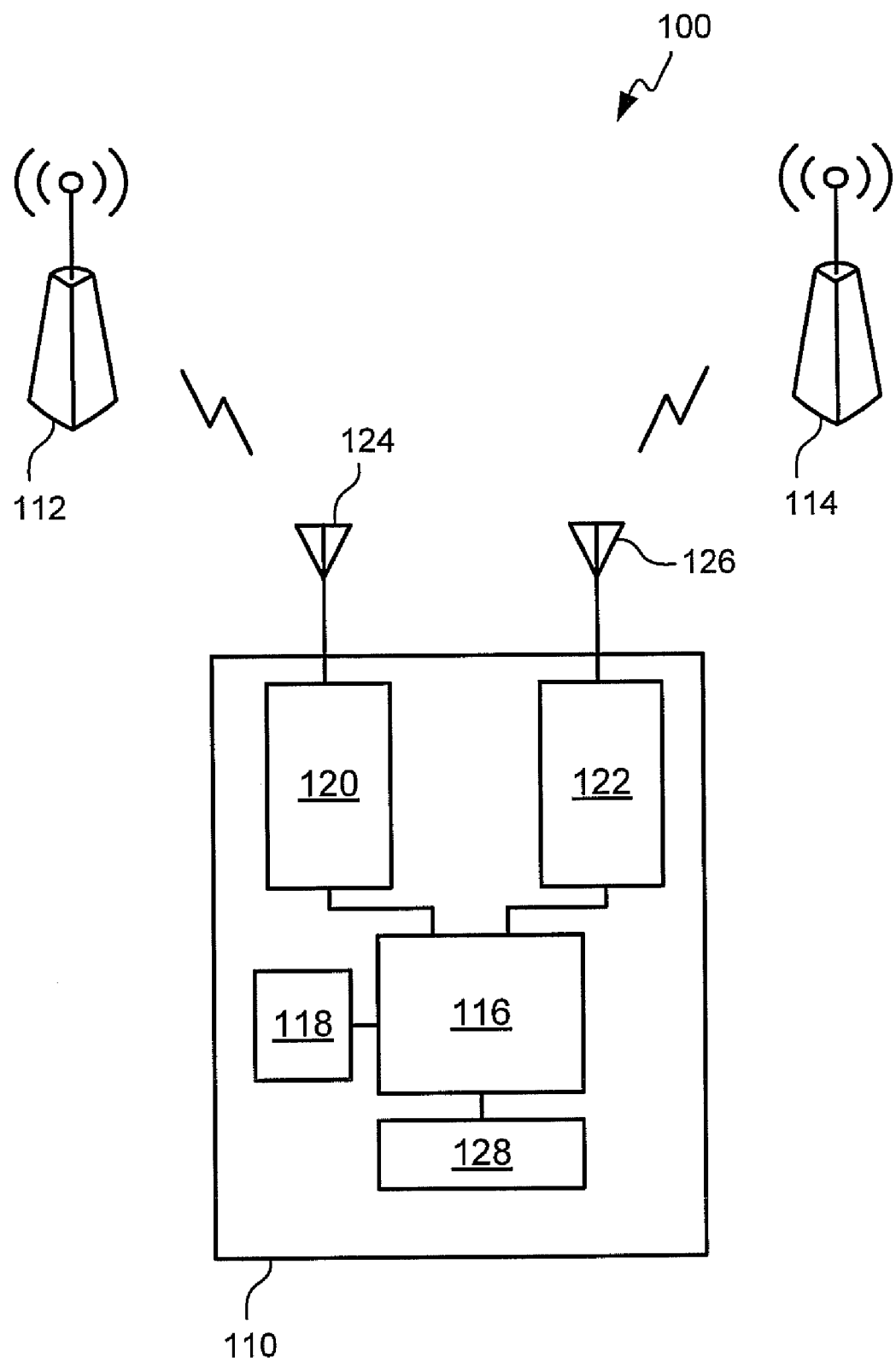
FIG. 1 illustrates a network arrangement including an exemplary multi-mode wireless communication device according to one embodiment of the present invention.

Referring first to FIG. 1, there is shown network arrangement 100 including exemplary multi-mode wireless communication device 110 according to one embodiment of the present invention. By way of example, multi-mode device 110 may be a mobile phone capable of communicating over two or more radio access technologies. According to one particular embodiment, multi-mode device 110 is capable of communicating over one of the several cellular networks 112 in accordance with code division multiple access (CDMA 2000, IS-95), Global System for Mobile Communications (GSM), WCDMA, or other Wireless Wide Area Networks (WWAN) standard, for example, and is further capable of communicating over one of the several packet data networks 114 in accordance with IEEE 802.16, IEEE 802.20, or other Wireless Local Area Networks (WLAN) protocols, such as IEEE 802.11, Bluetooth, for example.

As shown in FIG. 1, multi-mode device 110 comprises processor 116 coupled to a memory 118 and to first transceiver 120 and second transceiver 122. Programming is stored in memory 118 and executed by processor 116 for the operation of multi-mode device 110. The details of the operation of multi-mode device 110 are described more fully below in conjunction with FIG. 2. First transceiver 120 is coupled to antenna 124 for communication with network 112, and second transceiver 122 is coupled to antenna 16 for communication with network 114. Processor 116 is also coupled to interface 128, which may further be coupled to one or more user-interface (UI) devices (not shown), such as a display device, input keys, a microphone, and a speaker, for example.

Figure 2:
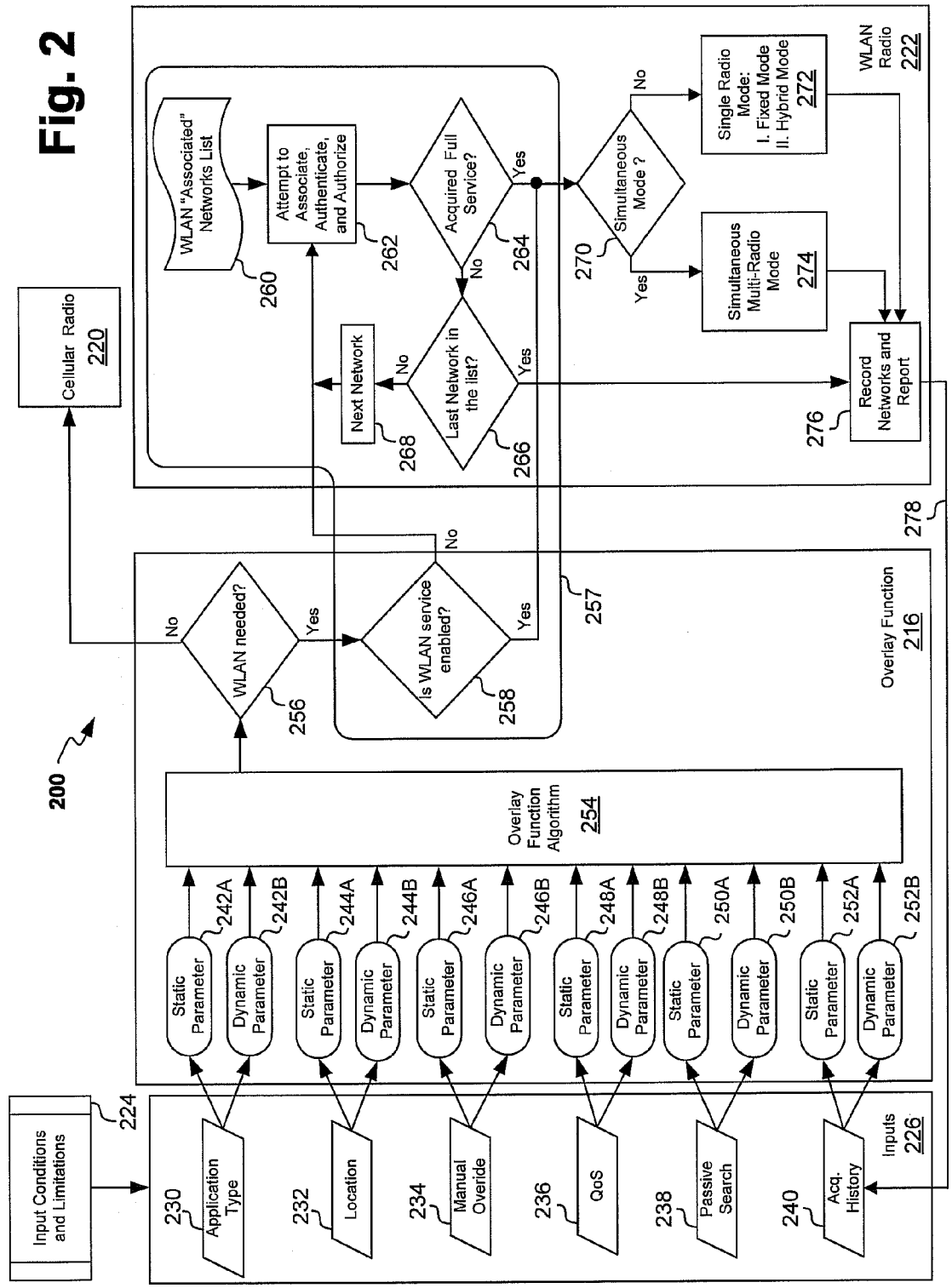
FIG. 2 illustrates an exemplary flowchart for providing multi-mode system selection of a multi-mode device according to one embodiment of the invention.

Referring now to FIG. 2, there is shown exemplary flowchart 200 for providing multi-mode system selection for a multi-mode device according to one embodiment of the invention. The multi-mode system selection technique depicted in FIG. 2 may be implemented in multi-mode device 110 of FIG. 1.

In flowchart 200, a plurality of inputs or parameters (224 and 226) are provided to overlay function 216. Overlay function 216 is executed by processor 116 of multi-mode device 110 in order to determine the operation of multi-mode device 110. Specifically, overlay function 216 determines which air-interface technology multi-mode device 110 will operate. Once a particular air interface technology is selected for operation, multi-mode device 110 will operate according to the appropriate technology standard for that air-interface technology. In some cases, overlay function may further determine that multi-mode device 110 may operate simultaneously according to more than one air-interface technology, as discussed below Referring again to FIG. 2, method 200 begins with providing carrier inputs 224 and overlay function inputs 226 to overlay function algorithm 254 of overlay function 216. Carrier inputs 224 may be provided by a network carrier (e.g., the cellular network carrier) for one of the wireless interface technologies that multi-mode device 110 operates. Carrier inputs 224 may be provided at the time multi-mode device 224 is provisioned, e.g., during initial device set up for the end user. In some cases, carrier inputs 224 may be provided periodically during updates to multi-mode device 110, e.g., via over-the-air update.

Carrier inputs 224 may include conditions, events or limitations for determining when the overlay function algorithm 254 should be executed by multi-mode device 110. Examples of conditions or limitations that may be used as inputs to overlay function 216 include: enable or disable status for WLAN services, period for executing overlay function, manual override and manual initiation, at a beginning of an application, in response to certain user interface input, system loss for a certain period of time, at device power-up, or change in location of the device, or upon a network triggering event (e.g. WLAN advertisement). Carrier inputs 224 are generally included as part of overlay function input parameters 226 provided to overlay function algorithm 254.

As shown in FIG. 2, exemplary overlay function input parameters 226 may include application type 230, location 232, manual override 234, qualify of service ("QoS") 236, passive search 238, and acquisition history 240, for example. In certain embodiments, each of input parameters (230-240) may have a static component (242A-252A) and/or a dynamic component (242B-252B). Static components may be pre-programmed and may not change often. Dynamic components often change frequently and may be updated in order for overlay function 216 to operate efficiently.

By way of illustration, static components 242A may define which air interface is suitable for a particular user application, dynamic component 242B may define which application is currently being used, static components 244A may define the range between the device's location and the WLAN location where there is an certain percentage of probability for the device to acquire WLAN, dynamic component 244B may define the device's current location and the WLAN locations, static component 248A may define latency or data rate, and dynamic parameter 252B may define history of recent network acquisition and reason for failure in an acquisition, for example.

At block 254 overlay function algorithm is executed based upon static and dynamic inputs 242A-252A, 242B-252B. The particular algorithm for system selection typically depends upon the particular air interface technologies, the carrier requirements, and the parameters provided by static and dynamic inputs 242A-252A, 242B-252B. By way of illustration, if a Video Streaming or Web-Browsing application is selected by the user of multi-mode device 110 (dynamic parameter 242B), and if a WLAN location directory is available to multi-mode device 110 (static parameter 244A), overlay function 216 may use the user's application selection and the WLAN location directory information to determine (at decision block 256) that multi-mode device 110 should operate as a WLAN radio (block 222) and attempt to acquire a WLAN access point (generally represented by block 257). Conversely, unnecessary search attempts (block 258) for WLAN access points can be avoided if, as a result of static and dynamic inputs 242A-252A, 242B-252B, overlay function 216 determines (at decision block 256) that multi-mode device 110 should operate as a cellular radio (block 220).

If overlay function 216 determines that multi-mode device 110 should operate as a WLAN radio, a determination is made if WLAN service is already enabled (associated, authenticated, authorized), e.g., from a previous WLAN session (at block 258). If WLAN service is already enabled, method 200 continues to block 270 as discussed below; otherwise, multi-mode device 110 attempt to acquire WLAN Service at block 262. Multi-mode device 110 may request or access WLAN acquisition parameters from the cellular network prior to switching to WLAN operation; alternatively, multi-mode device 110 may use existing WLAN information stored in the device (block 260). By way of illustration, WLAN acquisition parameters may include Service Set Identifiers ("SSIDs") with geographical information ("GEO") association tags. Other WLAN network parameters, such as authentication and authorization parameters, may also be available to multi-mode device 110 once the device acquires a WLAN AP, and assist with the typical functions of the WLAN radio.

Once multi-mode 110 acquires a WLAN AP, the device would typically authenticate with the WLAN AP (block 262) followed by an authorization with the upper layer in the core network as needed. If full service acquisition is unsuccessful (determined at block 264), further attempts to associate, authenticate and gain authorization from the next WLAN AP network (block 268) is carried out until the last WLAN AP network (determine at block 266) is attempted. If a WLAN AP network was not successfully acquired and the WLAN AP networks have been exhausted (at block 266), the results of the WLAN network acquisition attempt and failure are recorded and reported (at block 276) as acquisition history inputs 240 and dynamic input parameters 252B to overlay function 216 as shown by path 278. For example, the results recorded and reported may include the success and/or failure of each attempt at association, authentication, and authorization for a particular WLAN network.

If full service acquisition is successful (at block 264), multi-mode device 110 would be considered to have reached idle state or equivalent in that system. Additionally, the device may also attempt to register with the home cellular network so that incoming pages can be received by the device on WLAN. If this cellular registration is also successful, the device may operate in WLAN only (single radio mode—block 272) without missing any incoming pages from the cellular network. If the registration with the home cellular network fails, the device may choose to: (1) stay on WLAN and simultaneously monitor the cellular network (for devices capable of simultaneous operation—determined at blocks 270 and 274), (2) stay on WLAN and periodically monitor the cellular network (hybrid mode—block 272), or (3) choose to stay in WLAN with incoming pages sent to voicemail (single radio mode—block 272). Alternatively (not shown), the device may re-acquire the cellular network and stop operation on WLAN (i.e. redirection). As shown in FIG. 2, the results of the home cellular network registration attempt and success/failure, and/or the operating mode of multi-mode device 110 as a result of the home cellular network registration attempt and success/failure are recorded and reported (at block 276) as acquisition history inputs 240 and dynamic input parameters 252B to overlay function 216 as shown by path 278. The results recorded and reported may include the indication of loss of service and the metrics associated with the loss of service.

In some embodiments, the acquisition history inputs 240 are also reported to the network provider of the cellular network via cellular radio 220. In response to the reported results, the network provider may update the carrier inputs 224 provided to overlay function 216 to further improve efficiency of system selection. For example, such updates can include updated parameters for use with association, authentication, and/or authorization steps (block 262), as discussed above.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A method for selecting at least one of a plurality of systems on a multi-mode device capable of communicating on a plurality of air interface technologies comprising a first air interface technology and a second air interface technology, the method comprising:
    receiving a carrier input indicating a limitation in applying an overlay function;
    executing the overlay function in accordance with the carrier input to identify an air interface technology from the first air interface technology and the second air interface technology;
    triggering a network acquisition attempt of a system corresponding to the identified air interface technology;
    determining results of the network acquisition attempt;
    executing the overlay function, using the results of the network acquisition attempt, to select one of the first air interface technology and the second air interface technology for communication by the multi-mode device; and
    if the network acquisition attempt was successful, determining whether the multi-mode device will communicate, simultaneously to communication using the selected one air interface technology, using a non-selected air interface technology of the first air interface technology and the second air interface technology.

2. The method of claim 1, further comprising:
    determining results of the network acquisition attempt;
    storing the results of the network acquisition attempt; and
    executing the overlay function to select one of the first air interface technology and the second air interface technology for communication by the multi-mode device based on the network acquisition attempt.

3. The method of claim 1, wherein the one of the first and second air interface technologies comprises a cellular radio interface technology, and the other one of the first and second air interface technologies comprises a wireless local area network radio interface technology.

4. The method of claim 1, wherein results of the network acquisition attempt include failure to acquire any available networks.

5. The method of claim 1, wherein results of the network acquisition attempt include loss of network services.

6. The method of claim 1, wherein results of the network acquisition attempt include an operating mode of the multi-mode device subsequent to a successful acquisition of the network acquisition attempt.

7. The method of claim 6, wherein the operating mode of the multi-mode device is identified as one of simultaneous radio mode, single radio mode, and hybrid radio mode.

8. The method of claim 2, further comprising:
    triggering a home registration attempt on the one of the first and second air interface technologies after a successful acquisition of the network acquisition attempt;
    determining results of the home registration attempt; and
    storing the results of the home registration attempt.

9. The method of claim 8, further comprising:
    executing the overlay function to select the one of the first and second air interface technologies based upon the stored results of the network acquisition attempt and the stored results of the home registration attempt.

10. The method of claim 2, further comprising:
    transmitting the stored results of the network acquisition attempt to a carrier associated with the one of the first and second air interface technologies;
    receiving an updated carrier input based on the stored results of the network acquisition attempt; and
    executing the overlay function to select one of the first and second air interface technologies based upon the stored results of the network acquisition attempt and upon the updated carrier input.

11. A multi-mode device comprising:
    a first transceiver coupled to a first antenna configured to communicate via a first air interface technology;
    a second transceiver coupled to a second antenna configured to communicate via a second air interface technology;
    a processor executing instructions for:
        receiving a carrier input indicating a limitation in applying an overlay function;
        executing the overlay function in accordance with the carrier input to identify an air interface technology from the first air interface technology and the second air interface technology
        triggering a network acquisition attempt of a system corresponding to the identified air interface technology;
    determining results of the network acquisition attempt;
    executing the overlay function, using the results of the network acquisition attempt, to select one of the first air interface technology and the second air interface technology for communication by the multi-mode device; and
    if the network acquisition attempt was successful, determining whether the multi-mode device will communicate, simultaneously to communication using the selected one air interface technology, using a non-selected air interface technology of the first air interface technology and the second air interface technology.

12. The device of claim 11, wherein the instructions further include:
    determining results of the network acquisition attempt;
    storing the results of the network acquisition attempt; and
    executing the overlay function to select one of the first air interface technology and the second air interface technology for communication by the multi-mode device based on the network acquisition attempt.

13. The device of claim 11, wherein the one of the first and second air interface technologies comprises a cellular radio interface technology, and the other one of the first and second air interface technologies comprises a wireless local area network radio interface technology.

14. The device of claim 11, wherein results of the network acquisition attempt include failure to acquire any available networks.

15. The device of claim 11, wherein results of the network acquisition attempt include loss of network services.

16. The device of claim 11, wherein results of the network acquisition attempt include an operating mode of the multi-mode device subsequent to a successful acquisition of the network acquisition attempt.

17. The device of claim 16, wherein the operating mode of the multi-mode device is identified as one of simultaneous radio mode, single radio mode, and hybrid radio mode.

18. The device of claim 12, wherein the instructions further include:
triggering a home registration attempt on the one of the first and second air interface technologies after a successful acquisition of the network acquisition attempt;
determining results of the home registration attempt; and
storing the results of the home registration attempt.

19. The device of claim 18, wherein the instructions further include:
executing the overlay function to select the one of the first and second air interface technologies based upon the stored results of the network acquisition attempt and the stored results of the home registration attempt.

20. The device of claim 12, wherein the instructions further include:
transmitting the stored results of the network acquisition attempt to a carrier associated with the one of the first and second air interface technologies;
receiving an updated carrier input based on the stored results of the network acquisition attempt; and
executing the overlay function to select one of the first and second air interface technologies based upon the stored results of the network acquisition attempt and upon the updated carrier input.

21. The method of claim 1, wherein the carrier input is a Wireless Local Area Network (WLAN) enable services status determining how the overlay function selects a WLAN air interface technology.

22. The method of claim 1, wherein the carrier input is a period for executing the overlay function.

23. The method of claim 1, wherein the carrier input determines how the overlay function processes a manual override.

24. The method of claim 1, wherein the carrier input determines how the overlay function processes a manual initiation.

25. The method of claim 1, wherein the carrier input determines how the overlay function processes a user input.

26. The method of claim 1, wherein the carrier input determines how the overlay function processes a change in location.

27. The method of claim 1, wherein the carrier input determines how the overlay function processes a network triggering event.

28. The method of claim 1, wherein the overlay function evaluates a plurality of input parameters in accordance with the carrier input to determine that the multi-mode device can use at least one of the air interface technologies.

29. The method of claim 28, wherein the plurality of input parameters is selected from the group comprising application type parameters, manual override parameters, quality of service (QoS) parameters, passive search parameters, acquisition history parameters, and combinations thereof.

30. The method of claim 28, wherein the plurality of input parameters comprises a static input parameter and a dynamic input parameter.

31. The device of claim 11, wherein the carrier input is a Wireless Local Area Network (WLAN) enable services status determining how the overlay function selects a WLAN air interface technology.

32. The device of claim 11, wherein the carrier input is a period for executing the overlay function.

33. The device of claim 11, wherein the carrier input determines how the overlay function processes a manual override.

34. The device of claim 11, wherein the carrier input determines how the overlay function processes a manual initiation.

35. The device of claim 11, wherein the carrier input determines how the overlay function processes a user input.

36. The device of claim 11, wherein the carrier input determines how the overlay function processes a change in location.

37. The device of claim 11, wherein the carrier input determines how the overlay function processes a network triggering event.

38. The device of claim 11, wherein the overlay function evaluates a plurality of input parameters in accordance with the carrier input to determine that the multi-mode device can use at least one of the air interface technologies.

39. The device of claim 38, wherein the plurality of input parameters is selected from the group comprising application type parameters, manual override parameters, quality of service (QoS) parameters, passive search parameters, acquisition history parameters, and combinations thereof.

40. The device of claim 38, wherein the plurality of input parameters comprises a static input parameter and a dynamic input parameter.

* * * * *